(12) United States Patent
VanZante et al.

(10) Patent No.: US 6,480,471 B1
(45) Date of Patent: Nov. 12, 2002

(54) HARDWARE SAMPLER FOR STATISTICAL MONITORING OF NETWORK TRAFFIC

(75) Inventors: Craig Alan VanZante, Roseville, CA (US); Douglas Edwin O'Neil, Auburn, CA (US); Trinh Van Pham, Sacramento, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/217,418

(22) Filed: Dec. 21, 1998

(51) Int. Cl.[7] .......................... H04L 12/26; H04L 12/28

(52) U.S. Cl. .................. 370/252; 370/401; 703/179; 709/224

(58) Field of Search ................................ 370/252, 253, 370/401, 254, 256; 709/220–224; 707/179–190

(56) References Cited

U.S. PATENT DOCUMENTS

| | | | | | |
|---|---|---|---|---|---|
| 4,817,080 A | * | 3/1989 | Soha | ............................ | 370/252 |
| 5,315,580 A | * | 5/1994 | Phaal | ........................ | 370/253 |
| 5,450,408 A | * | 9/1995 | Phaal | ......................... | 370/401 |
| 5,600,632 A | | 2/1997 | Schulman | .................... | 370/252 |
| 5,850,523 A | * | 12/1998 | Gretta, Jr. | ................... | 709/224 |
| 6,308,148 B1 | * | 10/2001 | Bruins et al. | ............... | 370/401 |

* cited by examiner

Primary Examiner—Steven Nguyen

(57) ABSTRACT

An apparatus for collecting data packets on a network, the apparatus containing at least one central processing unit (CPU) having a data table, and a media access controller (MAC) receiving all the packets from the network. Generally, a packet filter filters the packets to obtain packets that match an input criteria. A counter increments a counter value when a skip count value does not match the counter value. A sampler cleanup samples the packets when the counter value matches the skip count value. The CPU processes the sampled packet into the CPU data table, and the above steps are repeated.

19 Claims, 1 Drawing Sheet

HARDWARE SAMPLER FOR STATISTICAL MONITORING OF NETWORK TRAFFIC

BACKGROUND OF THE INVENTION

The present invention generally relates to a network monitoring device, and more particularly to a network monitoring device that samples a stream of selected packets from a network traffic.

As computer networks continue to grow in complexity and importance, the need to collect information about network usage and problems increase. To gain a full picture of what events are occurring on the network, a network manager collects traffic information from segments of the network. Increasingly, all but trivial networks contain multiple segments with the network traffic being confined within individual segments, if possible, to increase performance. Further, the networks are often switched, as opposed to shared networks, thus the segment connections are point to point, single connections, containing traffic only for that segment. Thus, known traffic collection solutions include using a network monitoring device, often called a monitor or probe, on each segment of the network.

Monitors are instruments that exist to aid a network manager or a network management service to oversee a network that is often geographically remote. Frequently, monitors are stand-alone devices that devote significant internal resources for the sole purpose of managing the network. Organizations often employ many monitors, one per network segment, to oversee the network.

A problem exists when employing stand-alone monitors on each segment of the network, since use of a monitor on each segment of the network adds expense and nodes to the network. Also, in a highly switched network it is nearly impossible to add stand-alone monitors, such as personal computers since there may be no network connection available for the monitor. In response to this problem, vendors of infrastructure products that are naturally part of the network, such as hubs and switches, add embedded monitors into the products.

Problems occur as the embedded monitors incorporate additional network segments, and segments of higher speeds. For example, Internet Engineering Task Force (IETF) provides standardized sets of information, referred to as Management Information Bases (MIBs), that network devices collect to aid network administrators in monitoring a network. Request for Comment (RFC) 1757 (RMON) and 2021 (RMON-II) standard MIBs, incorporated herein by reference, contain information collected from every packet on the network. As network speeds increase, it follows that packet speeds climb, and analysis of each packet becomes increasingly expensive and difficult. Already resource restrained embedded systems cannot maintain added and faster ports.

Thus, Hewlett-Packard Company® has developed algorithms that provide statistical approximations of network traffic given a stream of randomly selected samples of packets from the network. U.S. Pat. No. 5,315,580, which is incorporated herein by reference, describes such an algorithm. In a sampling operation, the monitor randomly selects a subset of packets to analyze, and extrapolates data collected from the subset to approximate the total traffic on the network. Thus, the network manager obtains reliable data without the monitor fully analyzing every packet on the network.

Some problems exist, however, with known sampling systems. First, as network speed and segment count increase, selecting packets as part of the random sample requires increased resources since the monitor still needs to count each packet for the algorithm. Second, the data that known monitors collect is less than the amount of data specified by IETF. IETF mandates that additional data be collected for the network than is collected by known samplers.

SUMMARY OF THE INVENTION

Accordingly, it is a primary object of the present invention to provide an improved apparatus for monitoring network traffic.

Another object of the present invention is to provide an improved apparatus handling multiple network segments.

Yet another object of the present invention is to provide an improved apparatus for collecting specified data.

Still another object of the present invention is to provide an improved apparatus for handling network segments of an increased speed.

Other objects and advantages will become patents upon reading the following detailed description, in conjunction with the attached drawing:

TABLE OF ACRONYMS

Figure 1:
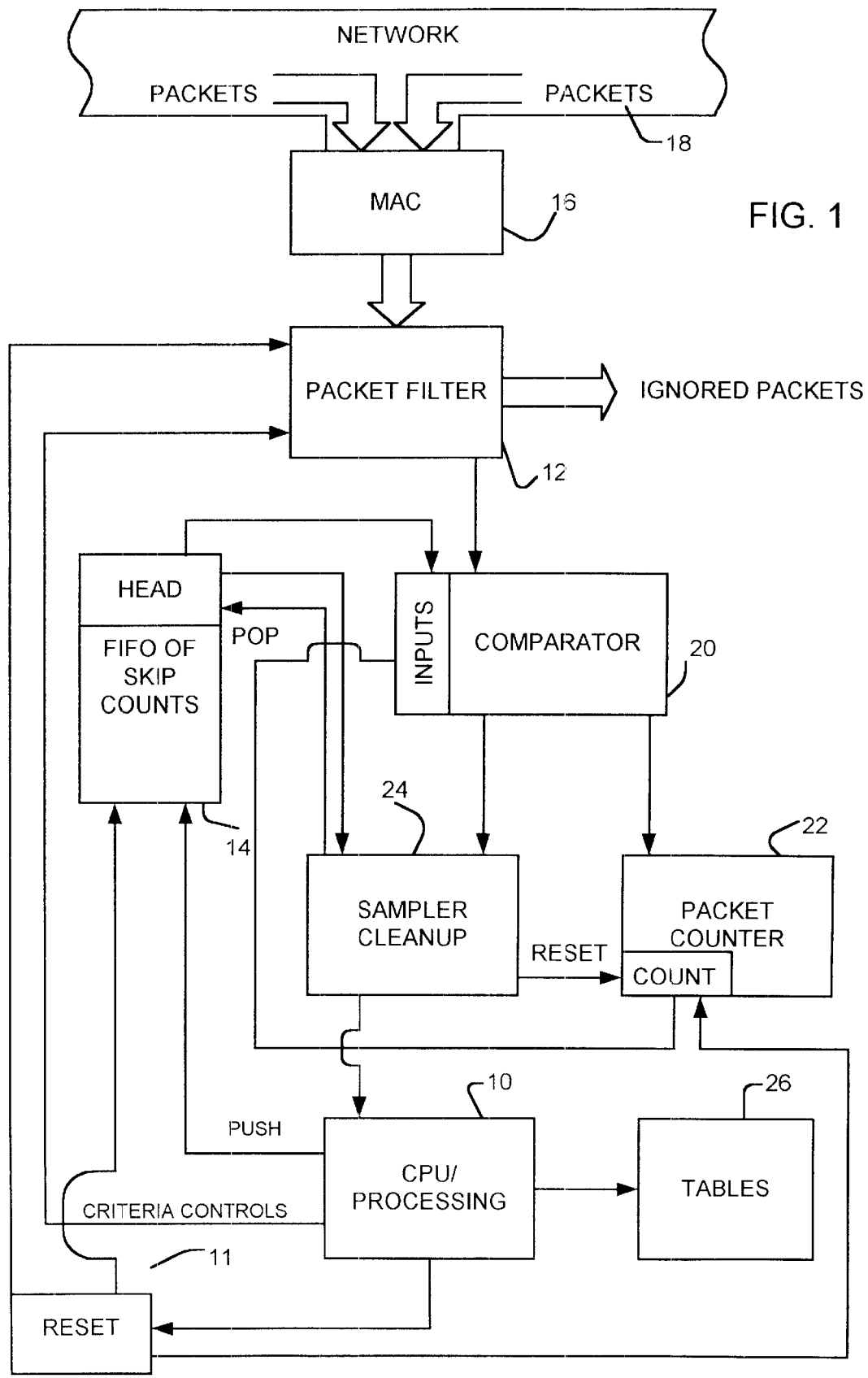
FIG. 1 shows a detailed flow chart of a preferred embodiment of the present invention.

This patent utilizes several acronyms. The following table is provided to aid the reader in determining the meaning of the several acronyms:

ASIC=application specific integrated circuit.
CPU=central processing unit.
FIFO=first in, first out.
IETF=Internet Engineering Task Force.
MAC=media access controller.
MIBs=Management Information Bases.
RFC=Request for Comment.

DETAILED DESCRIPTION

Broadly stated, the present invention is directed to an improved apparatus for gathering samples of network packets to be used by algorithms for monitoring network traffic. More specifically, the present invention is an apparatus for collecting data packets on a network, the apparatus containing at least one central processing unit (CPU) having a data table. A media access controller (MAC) receives the data packets from the network and a packet filter filters the packets to obtain packets that match an input criteria. A counter increments a counter value when a skip count value, described below, does not match the counter value. A sampler cleanup samples the packets when the counter value matches the skip count value. Thereafter, the CPU processes the sampled packet into the CPU data table, or sends the packets out for processing.

It should be noted that for explanation purposes, the present invention refers to RMON type monitoring, however, any kind of statistical monitoring can utilize the present invention, e.g., traffic matrices, conversation matrices, and end node or host statistics. Additionally, to ensure statistically valid packet sampling accomplished by the present invention, a skip count value corresponds to a number of packets skipped before sampling the next packet.

Preferably an engineer or network administrator determines an average value of the skip count values. To ensure a random sampling, a number for the skip count value should be chosen to avoid obtaining patterns of packets. For example, a skip count of two should be avoided if every other packet on the network is a reply packet since the sampling would then only contain reply packets, and not, for example, any request packets.

As is known in the art, choice of the skip count value also depends on other factors. A factor to consider when choosing the skip count value includes a speed of the network. For example, an average skip count value may be one hundred, i.e., on the average a packet is sampled between every hundred packets. Thus, using known techniques, the engineer directs the CPU to load skip count values, for example, between fifty and one hundred and fifty. For a busier system, the average skip count value may be raised to two hundred, or conversely, for a quieter system, the average skip count may be lowered to fifty. Moreover, when determining the skip count value, a power of the CPU must also be considered. Higher skip count values should be used with less powerful CPU's. Additional considerations include the amount of time required to process a sample, and a required accuracy of the sampled packets to represent all packets on the system. It is contemplated that the engineer or network administrator may adjust the average skip count value over time.

Turning now to the drawings, and particularly to FIG. 1, a CPU 10 sets a register bit to perform a reset 11. First, the reset 11 sets at least one filter 12 to a default criteria that is implementation dependent. When the sampler of the present invention is in an off state, the filter criteria equals no packets, i.e., no packets are sampled. Thus, a preferred default criteria is no packets. Additionally, the reset empties a FIFO 14, i.e., empties a list of items that are added at one end of the list, and consumed from the other end of the list. Further, the reset 11 sets a counter value to a predetermined integer, such as zero.

A sampling process begins as a desired filter criteria of the filter 12 is initialized. A configuration register, not shown, as defined for an application specific integrated circuit (ASIC) contains bits that control the filter 12. Importantly, the filter criteria is dynamically changeable to allow an assortment of packet characteristics. For example, the criteria may allow all packets, only good packets, and/or packets within a size range, to pass through the filter 12. Additionally, the filter criteria includes packets that accommodate certain data patterns, for example, all packets arriving from a specified address, or arriving from an address other than one that is specified.

A skip count register, not shown, loads at least one skip count value into the FIFO 14. The skip count register is a FIFO preferably four entries deep, and the head of the FIFO 14 is the oldest skip count value presently existing in the FIFO 14. To prevent the FIFO 14 from becoming empty, as each skip count value entry is consumed, a status bit of a status register, described below, is set to notify the CPU to write another skip count value to the FIFO 14. As such, the sampler of the present invention services a next sample immediately, without requiring the CPU to intervene with another skip count value. It has been found that the four level FIFO allows for a reasonable interrupt latency while the skip count values are small, without missing a sample. Different implementations may mandate a greater or smaller FIFO entry depth depending on how fast samples are copied or removed from the network and a speed of the CPU. For example, a deeper FIFO depth is necessary if the CPU is slow or samples are being removed at a high rate.

The status register, not shown, contains status bits relating to a status of samples and the FIFO 14. These status bits are necessary for software to monitor the hardware sampler's operation. Based on a value of the status bit, the software performs different operations. For example, one status bit indicates that a packet was received and a new count should be provided to the skip count register. Another status bit signifies that one or more received packets were dropped due to an insufficient system resources, such as buffer availability. Yet another bit indicates that the skip count FIFO 14 is full. Yet still another bit exhibits that a skip count was not available in the FIFO 14.

The MAC 16 receives all packets from a network 18. The MAC 16 passes the packets received from the network 18 to the filter 12. The filter 12 determines the packets that meet the criteria presented earlier by the CPU 10. The filter 12 ignores packets that do not meet the criteria by discarding the packet if it was a copy, or returning the packet to the network if it was not a copy. Conversely, the filter 12 passes matched packets, i.e., packets that match the filter criteria, to a comparator 20. As the comparator 20 receives the matched packet from the filter 12, the comparator 20 compares the current skip count value with the counter value that was reset during the initialization process.

If the skip count value does not match the counter value, the comparator passes the matched packet to a counter 22 to increment the counter value but does not sample the packet. The counter 22 adds an integer, for example the integer one, to the counter value each time the counter 22 is presented with a packet. The counter 22 presents the counter value to the comparator 20 and discards the packet if it was a copy, or returns the packet to the network if it was not a copy.

If the skip count value does match the counter value, however, then the required number of packets were skipped, thus the comparator 20 samples and passes the matched packet to the sampler cleanup 24. Upon receiving the matched packet, the sampler cleanup 24 resets the counter value to an integer, such as zero, and pops, or removes, the head skip count value from the FIFO 14. Thus, the next skip count value in the FIFO 14 is the value that the comparator 20 will compare to the counter value to determine the amount of packets to skip before the next packet is sampled. Additionally, the sampler cleanup 24 bundles the removed skip count value with pertinent packet information that the CPU needs to build a data table. For example, depending on the data table, pertinent packet information includes the entire packet, or a portion of the packet such as status information and address information. The sampler cleanup 24 passes the bundled skip count value and the packet information to the CPU 10.

The CPU 10 can process the bundled skip count value and the matched packet using an algorithm. Additionally, the CPU 10 can transmit the matched packet for processing to a remote system, such as a personal computer or a UNIX work station, to reduce a load on the CPU 10. Preferably, the CPU 10 accomplishes the necessary processing to generate traffic tables 26 from a stream of received packets. Traffic tables 26 contain RMON-like, or other, data that the CPU 10 extrapolates from the sampled packets. Network administrators access the traffic table 26. After processing the packets, the CPU 10 pushes, or reloads, the FIFO 14 with a skip count variable, and sets the filter criteria as a user desires.

From the foregoing description, it should be understood that an improved sampler has been shown and described which has many desirable attributes and advantages. By incorporating this invention into network infrastructure devices, one on each network segment to which the device is attached, system resources that would have been allocated to monitoring each packet on the network need only process each sample. Thus, a cost of the system is reduced or other uses of the system are allowed while still providing necessary network administration data. The present invention also allows flexibility in the type of samples being collected so that network administrators can obtain the data that they desire.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A hardware sampler for statistically monitoring an activity on a network carrying message packets of a predetermined type, the sampler comprising:
   a receive means for detecting substantially all message packets carried on the network;
   a first sampling means operatively interfaced with said receive means for selecting only message packets that match a first filter criteria, selection being dynamically changeable to allow for an assortment of packet characteristics;
   a second sampling means interfaced with said first sampling means for selecting message packets based on a second filter criteria to derive statistically accurate information relating to network traffic; and
   a processing means interfaced with said first sampling means and said second sampling means for collecting a receive data descriptor and performing initializations.

2. The sampler as defined in claim 1 wherein said receiving means is a media access controller (MAC).

3. The sampler as defined in claim 1 wherein said first filter criteria includes one or more filters capable of filtering network carrying message packets to sets of no packets, all packets, the size of packets, the validity characteristics of the packets, and packets that accommodate certain data patterns.

4. The sampler as defined in claim 1 wherein said second filter criteria includes one or more of a speed of the network traffic, a time required to process a sample, a power of said processing means, and a required level of accuracy of sampled packets to represent meaningful traffic on the network.

5. The sampler as defined in claim 1 wherein said second sampling means further comprises:
   a comparator means interfaced with said first sampler means for comparing a counter value to a skip count value representing a number of packets skipped before a packet is sampled;
   an incrementing means operatively connected to said comparator means for changing a counter value based on said comparator means determining that said skip count value differs from said counter value; and
   a sampler cleanup means interfaced with said comparator means for performing cleanup based on said comparator means determining that said skip count value equals said counter value.

6. The sampler as defined in claim 5 wherein said skip count value is contained in a skip count register.

7. The sampler as defined in claim 5 wherein said skip count value is an average value that varies within a selected range of values.

8. The sampler as defined in claim 7 wherein said processing means determines said range of skip count values.

9. The sampler as defined in claim 6 wherein said skip count register is a FIFO of skip count value entries.

10. The sampler as defined in claim 9 wherein said skip count value is an oldest value in said FIFO of said skip count value entries.

11. The sampler as defined in claim 5 wherein said sampler cleanup means further comprises:
    a removing means for sending said skip count value from a FIFO to said sampler cleanup means;
    a bundling means for creating a receive data descriptor by bundling said removed skip count value with a packet information when said skip count value equals said counter value; and
    a passing means for sending said receive data descriptor to said processing means.

12. The sampler as defined in claim 11 wherein said packet information includes information from an entire packet, parts of data from the packet, or information derived from the packet.

13. The sampler as defined in claim 1 wherein said processing means further comprises:
    an initializing means for setting said first filter criteria;
    a resetting means for resetting said counter value to a predetermined value when the sampler is reset and said sampler cleanup means is performed;
    a FIFO load means for loading said FIFO with at least one skip count value; and
    a MAC enabling means for enabling a MAC to receive substantially all the packets from the network.

14. The sampler as defined in claim 13 wherein said predetermined value is zero.

15. The sampler as defined in claim 13 wherein said processing means further comprises a central processing unit (CPU) to create a data table based on said receive data descriptor.

16. The sampler as defined in claim 15 wherein said data table is an RMON-like data table.

17. The sampler as defined in claim 1 wherein said processing means further includes a transmitting means for delivering said sampled packet to a system for processing.

18. The sampler as defined in claim 17 wherein said system for processing is a remote personal computer.

19. The sampler as defined in claim 17 wherein said system for processing is a remote UNIX work station.

* * * * *